United States Patent [19]

Nink

[11] 4,217,166
[45] Aug. 12, 1980

[54] PROCESS FOR THE PRODUCTION OF LITHIUM FLUORIDE DETECTORS

[75] Inventor: Reinhard Nink, Berlin, Fed. Rep. of Germany

[73] Assignee: Bayer Aktiengesellschaft, Leverkusen, Fed. Rep. of Germany

[21] Appl. No.: 836,344

[22] Filed: Sep. 26, 1977

[30] Foreign Application Priority Data

Oct. 1, 1976 [DE] Fed. Rep. of Germany ....... 2644435

[51] Int. Cl.² .............................................. B01J 17/34
[52] U.S. Cl. ................................... 156/605; 156/615; 156/DIG. 75; 252/301.4 H; 252/301.4 F
[58] Field of Search ............... 156/605, 615, DIG. 75; 252/301.4 H, 301.4 F

[56] References Cited

U.S. PATENT DOCUMENTS 3,320,180  5/1967  Swinehart ..................... 252/301.4 H

FOREIGN PATENT DOCUMENTS 6412943  5/1965  Netherlands ..................... 252/301.4 H
1154484  6/1969  United Kingdom ............. 252/301.4 H

*Primary Examiner*—Hiram H. Bernstein
*Attorney, Agent, or Firm*—Sprung, Felfe, Horn, Lynch & Kramer

[57] ABSTRACT

A lithium fluoride detector for thermoluminescence dosimetry is produced by pulling a doped lithium fluoride monocrystal from the melt. Lithium fluoride powder with titanium added to it is used as starting material and oxygen is incorporated into the lithium fluoride crystal lattice during or after production of the crystal. If titanium dioxide is added to the starting material, the oxygen may be incorporated during production of the crystal by eliminating the oxygen from the titanium dioxide.

10 Claims, 1 Drawing Figure

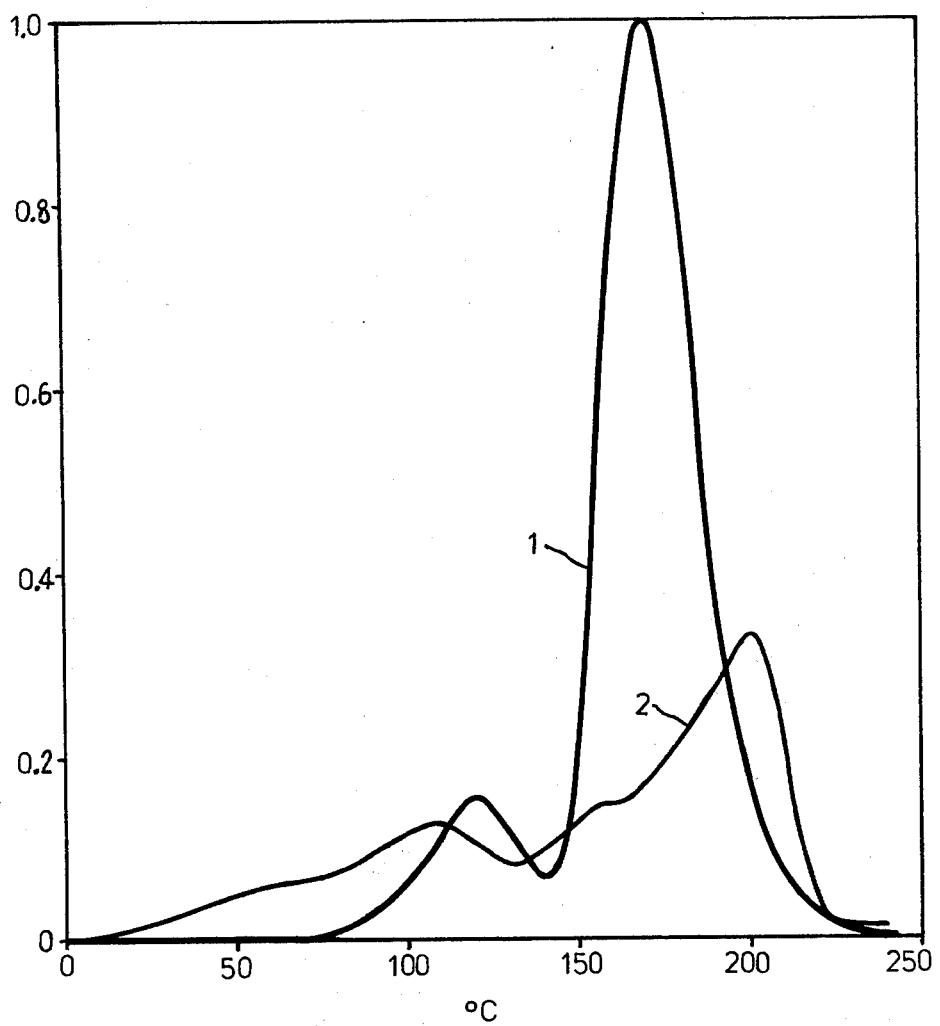

PROCESS FOR THE PRODUCTION OF LITHIUM FLUORIDE DETECTORS

This invention relates to a process for the production of lithium fluoride detectors for thermoluminescence dosimetry.

The dosimetry of high-energy radiation (X-radiation) by means of thermoluminescence (the radiation-induced, thermally stimulated emission of light) is known as "thermoluminescence dosimetry" (TLD).

Of the various known substances which are suitable for TLD purposes, lithium fluoride (LiF) plays an important part because it behaves very similarly to human tissue with regard to the absorption of high-energy radiation of different quality. The lithium fluoride which has hitherto been used for TLD purposes is doped with a few 100 ppm of magnesium, with a few ppm of titanium and with a few 10 ppm of aluminium, silicon, calcium and/or similar elements in order to produce the required thermoluminescence properties. The production of such detectors is described, for example, in U.S. Pat. No. 3,320,180.

The sensitivity of lithium fluoride detectors is defined as the quotient of the total thermoluminescent light and the radiation dose. A detailed report on the correlations is given, for example, in "PTB-Mitteilungen" 85, No. 6 (1975), pages 441–447. The sensitivity of the lithium fluoride crystals currently used for radiation dosimetry allows dose measurements down to a lower limit which at present just satisfies the legally prescribed requirements governing dosimetry in humans. However, an increase in sensitivity is desirable, on the one hand, to enable even smaller human doses than the legally permitted doses to be measured and, on the other hand, to increase the accuracy of measurement in the normal human dose range.

Accordingly, an object of the present invention is to develop a process by which it is possible to produce more sensitive lithium fluoride detectors for thermoluminescence dosimetry.

In order to achieve this object, a lithium fluoride monocrystal doped with foreign substances is produced in known manner from the melt. According to the present invention, lithium fluoride powder with only titanium added to it is used as starting material for the production of the monocrystal and oxygen is incorporated into the lithium fluoride crystal lattice during or after production of the crystal. The amount of titanium added to the starting material is preferably from 1 to 200 atom ppm. In practice, pure lithium fluoride powder is mixed with elemental titanium or titanium fluoride ($TiF_4$).

BRIEF DESCRIPTION OF THE DRAWINGS

One embodiment of the present invention is illustrated in the following with reference to the accompanying drawing which shows the thermoluminescent curve (1) of a crystal sample produced by the process according to the present invention compared with a thermoluminescent curve (2) of a conventional magnesium-and titanium-doped material (tempering: 1 h, 480° C., cooling rate 10 K min.$^{-1}$).

Oxygen is preferably incorporated during production of the crystal by the elimination of oxygen from titanium dioxide which was added to the starting material beforehand. The concentration of the titanium dioxide is from 1 to 200 atom ppm. This powder mixture is then fused and a monocrystal produced from the resulting melt in known manner, for example by the Czochralski process.

In an alternative process for incorporating the oxygen into the lithium fluoride crystal lattice, the oxygen is allowed to diffuse into the lithium fluoride crystal from an oxygen-containing atmosphere at elevated temperatures after the crystal has been formed.

The thus-produced lithium fluoride detectors show the following improvements over conventional detectors:

(a) The production of the material is dependent upon only a few influencing factors and, in the most favourable case, solely upon the doping with titanium dioxide.
(b) The detectors produced by the process according to the present invention have a distinctly higher sensitivity than conventional detectors.
(c) In order to obtain reproducible properties, the conventional temperature cycles do not have to be so strictly adhered to in regard to the cooling rates where lithium fluoride detectors are reused in dosimetry.

EXAMPLE 40 g of lithium fluoride powder were thoroughly mixed with 6 mg of titanium dioxide powder and the resulting mixture introduced, under a high vacuum, into a crucible of glassy carbon. The powder mixture was then melted under an argon atmosphere of 300 Torr (throughflow rate 20 Nl of argon/h). A crystal bulb weighing approximately 25 g is pulled from the melt by the Czochralski process using a crystallographically oriented monocrystal.

Crystal samples were cut from the bulb.

The drawing shows the thermoluminescence curve of one such crystal sample. The dosimetrically important light total between 140° C. and 230° C. (area below the curve = integral of the curve) is approximately three times greater than the light total of a sample of identical shape of conventional lithium fluoride material for the same radiation dose and also under otherwise the same conditions.

In the case of the material produced by the process according to the present invention, the dependence of the light total upon the cooling rate after tempering is lower and, with regard to the thermal stresses on the material, more favourable than in the case of the conventional material. After tempering at 480° C. and cooling at a rate of 0.2 K. min.$^{-1}$, the light total of the new material changed by +18% as opposed to −61% in the case of the known material, both materials in comparison to a cooling rate of 10 K. min.$^{-1}$ as normally applied in dosimetry.

The linearity of the new detectors complies with the requirements of thermoluminescence dosimetry.

What we claim is:

1. A process for the production of a lithium fluoride detector for thermoluminescence dosimetry comprising a lithium fluoride monocrystal doped with one or more foreign substances from a melt, by using lithium fluoride powder with only titanium added to it as the starting material for the production of the monocrystal and incorporating oxygen into the crystal lattice at least during production of the crystal.

2. A process as claimed in claim 1 wherein oxygen is incorporated by adding titanium dioxide to the starting material and by eliminating oxygen from the titanium dioxide during production of the crystal.

3. A process as claimed in claim 2 in which from 1 to 200 atom ppm of titanium dioxide is added.

4. A process as claimed in claim 1 in which oxygen is incorporated after production of the crystal by contact with an oxygen-containing atmosphere at an elevated temperature.

5. A process as claimed in claim 4 in which from 1 to 200 atom ppm of titanium is added.

6. A lithium fluoride detector for thermoluminescence dosimetry comprising a lithium fluoride monocrystal doped with one or more foreign substances from a melt produced by utilizing fluoride powder with only titanium added to it as the starting material and incorporating oxygen in the crystal lattice at least during production of the crystal.

7. The detector as claimed in claim 8 wherein oxygen is incorporated by adding titanium dioxide to the starting material and by eliminating oxygen from the titanium dioxide during production of the crystal.

8. The detector as claimed in claim 7 in which from 1 to 2000 atom ppm of titanium dioxide is added.

9. The detector as claimed in claim 8 in which oxygen is incorporated after production of the crystal by contact with an oxygen-containing atmosphere at an elevated temperature.

10. The detector according to claim 6, having a response peak in the temperature range between about 140° C. to 230° C.

* * * * *